United States Patent [19]
Berg

[11] Patent Number: 5,218,488
[45] Date of Patent: * Jun. 8, 1993

[54] METHOD AND APPARATUS FOR PRODUCING WRITE AND ERASE MAGNETIC FIELD FOR DISK DRIVE

[75] Inventor: Thomas E. Berg, Fort Collins, Colo.

[73] Assignee: Hewlett-Packard Company, Palo Alto, Calif.

[ * ] Notice: The portion of the term of this patent subsequent to Dec. 11, 2007 has been disclaimed.

[21] Appl. No.: 729,248

[22] Filed: Jul. 12, 1991

Related U.S. Application Data

[60] Continuation of Ser. No. 698,244, May 6, 1991, which is a continuation of Ser. No. 401,095, Aug. 31, 1989, abandoned, Division of Ser. No. 246,776, Sep. 20, 1988, Pat. No. 4,977,549.

[51] Int. Cl.$^5$ .............. G11B 13/04; G11B 11/12; G11B 11/10
[52] U.S. Cl. .................. 360/59; 369/13; 360/114
[58] Field of Search ............ 369/13; 360/59, 66, 360/114; 365/122

[56] References Cited

U.S. PATENT DOCUMENTS 4,977,549 12/1990 Berg ........................... 369/13

FOREIGN PATENT DOCUMENTS

| | | | |
|---|---|---|---|
| 60-226044 | 11/1985 | Japan | 369/13 |
| 61-222001 | 10/1986 | Japan | 360/66 |
| 62-08345 | 1/1987 | Japan | 360/114 |
| 62-14352 | 1/1987 | Japan | 360/114 |
| 62-78703 | 4/1987 | Japan | 360/66 |

Primary Examiner—Hoa T. Nguyen

[57] ABSTRACT

A magneto-optic disk drive includes a magneto-optic disk and a rotary arm for positioning a focus/bias field switching assembly adjacent bit positions on the disk. A bias field switching assembly includes an annular permanent magnet mounted within a guide for movement between write and erase positions and an objective lens. The magnet has central and pole surfaces generally parallel to the disk. Coils on the guide are energized to drive the magnet between the write and erase positions. In its erase position the magnet impinges a first polarity erase magnetic field on the disk. In its write position the magnet impinges a second polarity write magnetic field upon the disk. The magnet is releasably latched in both its write and erase positions by ferro-magnetic elements mounted to the guide.

10 Claims, 4 Drawing Sheets

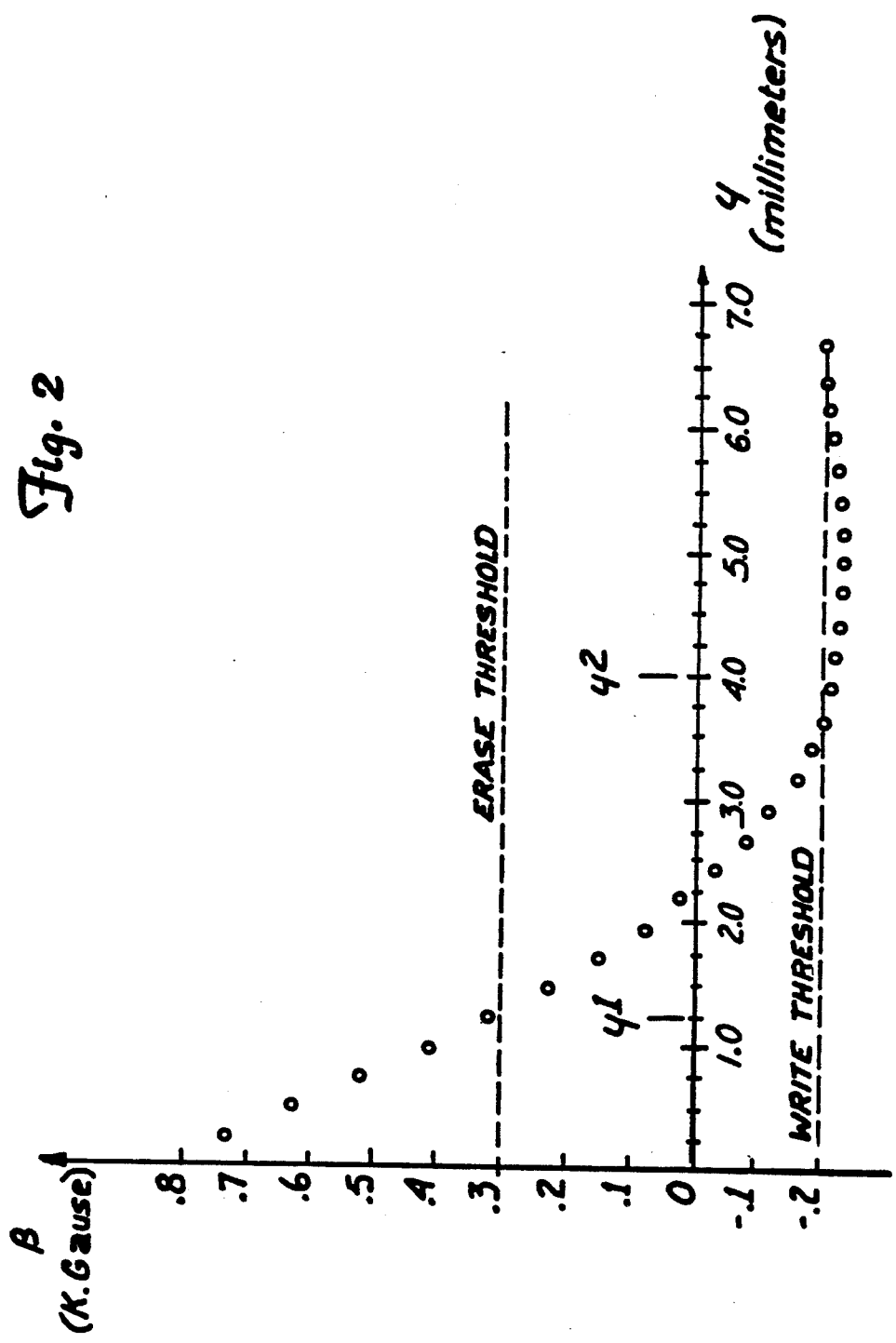

METHOD AND APPARATUS FOR PRODUCING WRITE AND ERASE MAGNETIC FIELD FOR DISK DRIVE

This application is a continuation of copending U.S. Patent Application Ser. No. 698,244 filed May 6, 1991, which is a continuation of Application Ser. No. 401,095 filed Aug. 31, 1989, now abandoned, which is a division of Application Ser. No. 246,776 filed Sep. 20, 1988, now U.S. Pat. No. 4,977,549 issued Dec. 11, 1990, each of which is hereby specifically incorporated by reference.

BACKGROUND OF THE INVENTION

1. Field of the Invention

The present invention relates generally to magneto-optic data recording systems. In particular, the present invention is a rotary arm having a distributed optical head mounted thereto, and a tracking actuator for use in a magneto-optic disk drive.

2. Description of the Prior Art

Magneto-optic data recording technology combines the eraseability features of magnetic data storage systems with the high data storage capacity of optical systems. A 5.25 inch magneto-optic disk can hold up to 600 M bytes of information, 1000 or more times the amount of information that a similarly sized magnetic floppy diskette can store. Magneto-optic disks are also transportable and can be transferred between drives. Since the reading, writing and erasing operations are performed with light beams rather than mechanical heads, they have long life, higher reliability, and are relatively immune to physical wear.

The principles of magneto-optic technology are well known. Information is digitally stored at bit positions on a magneto-optic disk. Typical bit positions have a diameter of 0.8 to 2.0 microns. The orientation of the magnetic field at each bit position can be switched between a digital one state in which its north pole is oriented upward, and a second digital zero state in which the magnetic field is reversed and the north pole oriented downward.

The orientation of the magnetic field at each bit position is selected by subjecting the bit position to the magnetic field of the appropriate polarity, and heating the bit position of the disk. The magnetic orientation of the bit position is frozen when the disk cools and returns to room temperature.

The magnetic fields of all bit positions in an unwritten disk will generally be oriented north poles down to represent a digital zero. When writing information, the bit positions will be subjected to a write magnetic bias field and heated by a high intensity laser beam. The orientation of the magnetic fields at the written bit positions will then reverse to north poles up. Bit positions are erased by subjecting them to an erase bias field of the opposite polarity, and again heating the bit. The magnetic field orientation at the erased bit positions will then reverse and switch to north pole down.

Data is read from the optical disk using a low-power laser beam. Because of the magneto-optic phenomenon known as the Kerr effect, the polarization of a laser beam impinged upon the bit positions will be rotated as a function of the magnetic orientation of the bit. The polarization of laser beam portions reflected from bit positions on the optical disk is detected by opto-electronic detector circuitry. Signals from the detector circuitry are then processed to determine whether the bit position is representative of a digital one or zero.

For purposes of convenience and protection, the optical disk is typically positioned within an enclosure to form a cassette. The cassette is loaded into an optical disk drive which is interfaced to a personnel computer or other data processing system and includes the mechanical and electrical subsystems required to write, read and erase data on the optical disk. Optical disk drives typically include an optical head having an objective lens for focusing the laser beam onto the optical disk, a drive motor for rotating the optical disk, a focus servo system and a tracking servo system. After the cartridge is inserted into the drive and its door opened, the disk drive motor and optical head are moved with respect to the optical disk to bring the drive motor and disk into engagement, and the optical head into its operating position adjacent the disk. In one known drive the optical head and drive motor are mounted to a frame pivotally suspended within the drive to form an assembly. After the disk is loaded into the drive, the assembly is driven to an operative position at which the drive motor engages the disk and the optical head is positioned adjacent the disk. The cartridge is loaded into and removed from the drive when the assembly is in a load/unload position spaced from the disk.

The tracking servo system is a closed force-position loop which includes an actuator for driving and positioning the optical head or objective lens about a tracking axis with respect to servo tracks on the optical disk. In one CD planar, the optical head is positioned on an elongated arm opposite a pivot mechanism from a counterweight. The arm and optical head are driven about a tracking axis by a pair of electromagnetic motors, one positioned between the pivot mechanism and each of the optical head and counterweight. Another known magnetic disk drive includes a V-shaped arm having two legs. The arm is movably mounted adjacent the disk by a pivot mechanism located at the arm vertex. The magnetic head is mounted at the free end of one arm, while the electromagnetic motor is mounted to the free end of the other. Pivot bearing and arm dynamics, including play in the bearing and bending of the arm, significantly affect the overall performance of these tracking servo systems.

The focus servo system, also a closed force-position loop, includes a focus actuator which drives and positions the objective lens about a focus axis with respect to the optical disk.

The focus servo system controls the focus actuator in such a manner as to keep the laser beam properly focused onto the optical disk. Linear electromagnetic motors are typically used a actuators.

Other known optical disk drive mechanisms and associated tracking and focus servo systems are disclosed generally in the following United States patents:

| | |
|---|---|
| 3,940,148 | Torrington et al. |
| 3,983,317 | Glorioso |
| 4,135,721 | Camerik |
| 4,326,284 | Elliott |
| 4,340,955 | Elliott |
| 4,517,617 | Tsuji et al. |
| 4,519,055 | Gilson |
| 4,545,045 | Baer et al. |
| 4,545,046 | Jansen et al. |
| 4,736,356 | Konshak |
| 4,752,922 | MacAnally et al. |

It is evident that there is a continuing need for improved disk drives. Mechanical systems of the drive must be compact and reliable. The effects of physical component dynamics upon tracking servo system response should be mitigated as much as possible to increase the performance of the drive.

SUMMARY OF THE INVENTION

The present invention is an optical disk drive in which undesired effects of arm dynamics in the force-position loop are substantially reduced. The optical disk drive includes a drive motor for rotating an optical disk in a disk plane, and a rotary arm. The arm is mounted for rotary movement in a plane parallel to the disk plane by a mount. An objective lens mounted to the rotary arm focuses a laser beam onto an optical disk. A tracking motor applies driving forces to the radial arm at a location opposite the objective lens from the mount to position the objective lens about a tracking axis with respect to the optical disk.

In one embodiment the tracking motor includes a coil mounted to the radial arm opposite the objective lens from the mount and immediately adjacent the objective lens. At least one magnet is mounted with respect to the drive motor adjacent the coils to form a linear motor.

Another embodiment includes a laser mounted to the rotary arm. Optics mounted to the rotary arm propagate a laser beam between the laser and objective lens. A detector mounted to the rotary arm detects portions of a laser beam modulated by and reflected from the optical disk, and produces signals representative thereof.

BRIEF DESCRIPTION OF THE DRAWINGS

FIG. 2 is a graph representing the magnitude of a the magnetic B field generated along a central axis of a magnet (such as that shown in FIG. 1) as a function of the distance from a pole surface of the magnet.

DETAILED DESCRIPTION OF THE PREFERRED EMBODIMENTS

Figure 1:
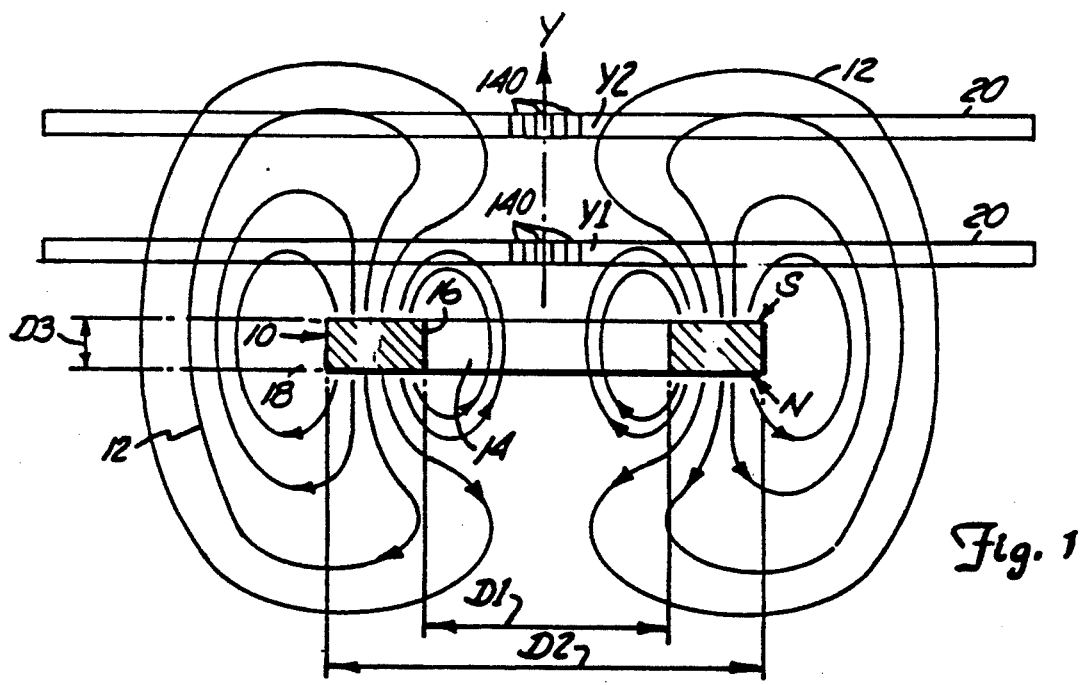
FIG. 1 is a cross-sectional representation of an annular magnet and the magnetic B field produced thereby.

The principles upon which the bias field switching system of the present invention is based can be described generally with reference to FIG. 1 in which an annular or ring-shaped permanent magnet 10 and flux lines 12 characterizing its magnetic B field are illustrated. A magneto-optic media such as disk 20 having bit positions 140 is also shown at two different positions with respect to magnet 10 in FIG. 1. Permanent magnets such as 10 are characterized by a north pole surface N, a south pole surface S, a central gap 14, an inner edge surface 16, and an outer edge surface 18. In the embodiment shown, magnet 10 has flat pole surfaces N and S, and flat edge surfaces 16 and 18. Magnet 10 has an inner diameter of dimension D1, an outer diameter of dimension D2, and a thickness of dimension D3.

As is evident from FIG. 1, magnetic flux lines 12 emanating from pole surfaces S and N near inner edge surface 16 converge upon one another within gap 14. Magnetic flux lines emerging from pole surfaces S and N near outer edge surface 18 converge upon one another beyond the outer edge surface, rather than within gap 14. At some point between edge surfaces 16 and 18, flux lines 12 emanating from pole surfaces N and S switch from a point of convergence at locations within gap 14 to locations beyond outer edge surfaces 18.

As a result of the physical configuration of permanent magnet 10 and the orientation of its flux lines 12, its magnetic B field along a Y-axis extending through a center of gap 14 perpendicular to pole surfaces S and N varies in both magnitude and polarity with increasing distance from the plane of the pole surfaces. Measured values of the magnetic B field along the Y-axis of a Crumax 322 magnet having an inner diameter D1 of 8.27 mm, an outer diameter D2 of 12.87 mm, and a thickness D3 of 0.30 mm, is shown in FIG. 2. As is evident from FIG. 2, at distances between 0.0 and 1.2 mm (i.e. y1), the magnetic 8 field has a positive value greater than 0.3 KGauss, the threshold required to erase data on magneto-optic disk 20 (i.e., the erase threshold). At distances between 4.0 and 5.75 mm, the field has a value less than the −0.2 KGauss write threshold required to write data to disk 20.

The above-described characteristics of permanent magnet 10 can be efficiently used to provide required write and erase magnetic B fields for a magneto-optic media. Referring again to FIG. 1, when the recording medium is positioned at a distance y1 from pole surface S, bit positions 140 of magneto-optic recording disk 20 along the Y-axis of the magnet will be exposed to a magnetic B field having a value greater than or equal to the required erase threshold. When the recording medium is positioned at distance y2 from pole surface S, bit positions 140 of disk 20 along the Y-axis will be exposed to a magnetic B field having a magnitude less than or equal to the required write threshold.

Figure 3:
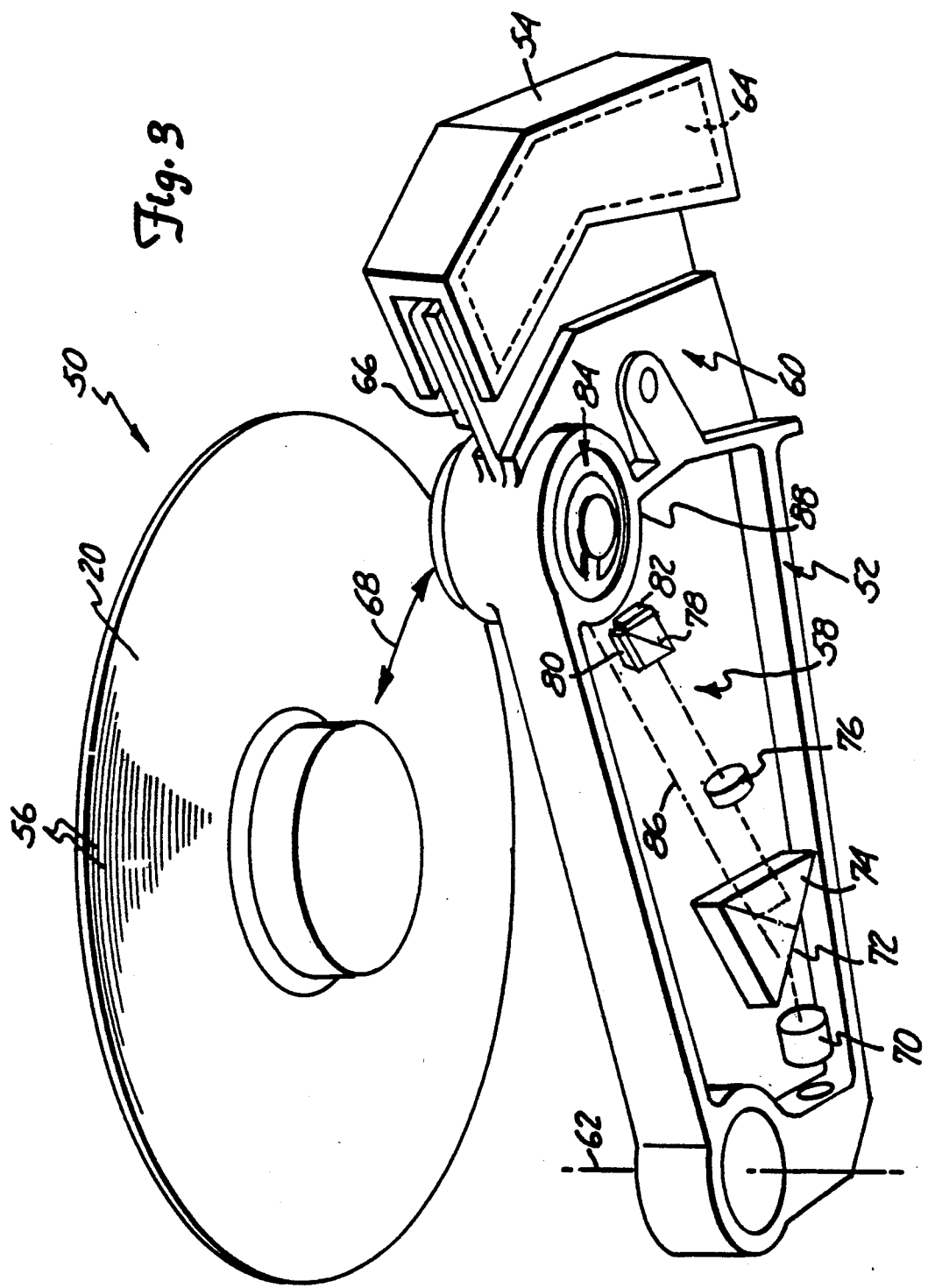
FIG. 3 is an illustration of portions of an optical disk drive which include a bias field switching mechanism in accordance with the present invention.

Portions of a magneto-optic disk drive 50 which make use of the above-described properties of magnet 10 to write, read and erase data on magneto-optic disk 20 are illustrated generally in FIG. 3. In addition to magneto-optic disk 20, disk drive 50 includes a rotary arm 52 and tracking drive magnet assembly 54. Disk 20 has a plurality of generally concentrically positioned and radially spaced recording tracks 56, and is rotated about a central axis by a drive motor (not shown).

Rotary arm 52 is formed by an actuator arm assembly 58 and a tracking drive coil assembly 60. Tracking drive coil assembly 60 can be manufactured as an integral unit with actuator arm assembly 58, or as a separate assembly which is subsequently fastened to the actuator arm assembly. Rotary arm 52 is mounted about an axis 62 for rotational movement in a plane parallel to that of disk 20. Tracking drive magnet assembly 54 is fixedly positioned with respect to disk 20 and supports a pair of generally planar permanent magnets 64 (only one of which is illustrated in FIG. 3) on opposite sides of tracking drive coil assembly 60. Wire coils 66 are rigidly mounted to coil assembly 60 at positions between magnets 64 of assembly 54. A magnetic field generated by coils 66 in response to tracking drive signals applied thereto will interact with the magnetic field of permanent magnets 64, and drive rotary arm 52 about a radial tracking axis 68 with respect to disk 20. The magnitude and polarity of tracking drive signals applied to coils 66 can be controlled in a manner which causes optical components mounted to arm 52 and described below to track, or remain centered over, a desired servotrack 56 on or from which information is being written, read or erased.

All optical and opto-electronic components including laser diode 70, beam shaping prism 72, turn-around prism 74, columnator lens 76, polarizing beam splitter 78, detectors 80 and 82, and focus/bias field switching assembly 84 are mounted to rotary arm 52. A radiation beam 86 is generated by a laser diode 70, and an incident portion directed toward focus/bias field switching assembly 84 by prism 72. Assembly 84 focuses the incident portion of beam 86 and impinges it upon a servotrack 56 of disk 20. When writing or erasing information on servotracks 20, laser diode 70 will generate a beam 86 having a sufficiently high intensity to heat bit positions 140 to the temperature needed to switch their magnetic orientation in the presence of the write and erase bias fields.

A relatively low intensity beam is produced by laser diode 70 when information is being read from disk 20. After being modulated as a function of the magnetic orientation of bit positions 140 (FIGS. 1, 4 and 5), a reflected portion of beam 86 is directed through prism 74 and lens 76 before being impinged upon beam splitter 78. Beam splitter 78 divides the beam into two separate polarization components which are impinged upon one of detectors 80 and 82. A differential signal derived from the signals produced by detectors 80 and 82 represents the information read from disk 20 (i.e., the digital states of bit positions 140).

Focus/bias field switching assembly 84 is mounted to a cylindrical housing 88 which is preferably fabricated as an integral section of actuator arm assembly 58. Focus/bias field switching assembly 84 includes a focusing subassembly 90 and a bias field subassembly 92 which are illustrated in conjunction with a portion of optical disk 20 in FIGS. 4 and 5. Focusing subassembly 90 includes a generally planar metallic pole piece 94, objective lens support 96, objective lens 98 and prism 100. Pole piece 94 is a circular member bonded by epoxy to a first or lower edge of housing 88. Pole piece 94 has a circular central aperture 95 and a pair of elongated apertures 102 positioned on opposite sides of the central aperture. A pair of permanent magnets 104 are bonded to opposite sides of each elongated aperture 102, and are radially spaced from one another with respect to central aperture 95.

Figure 4:
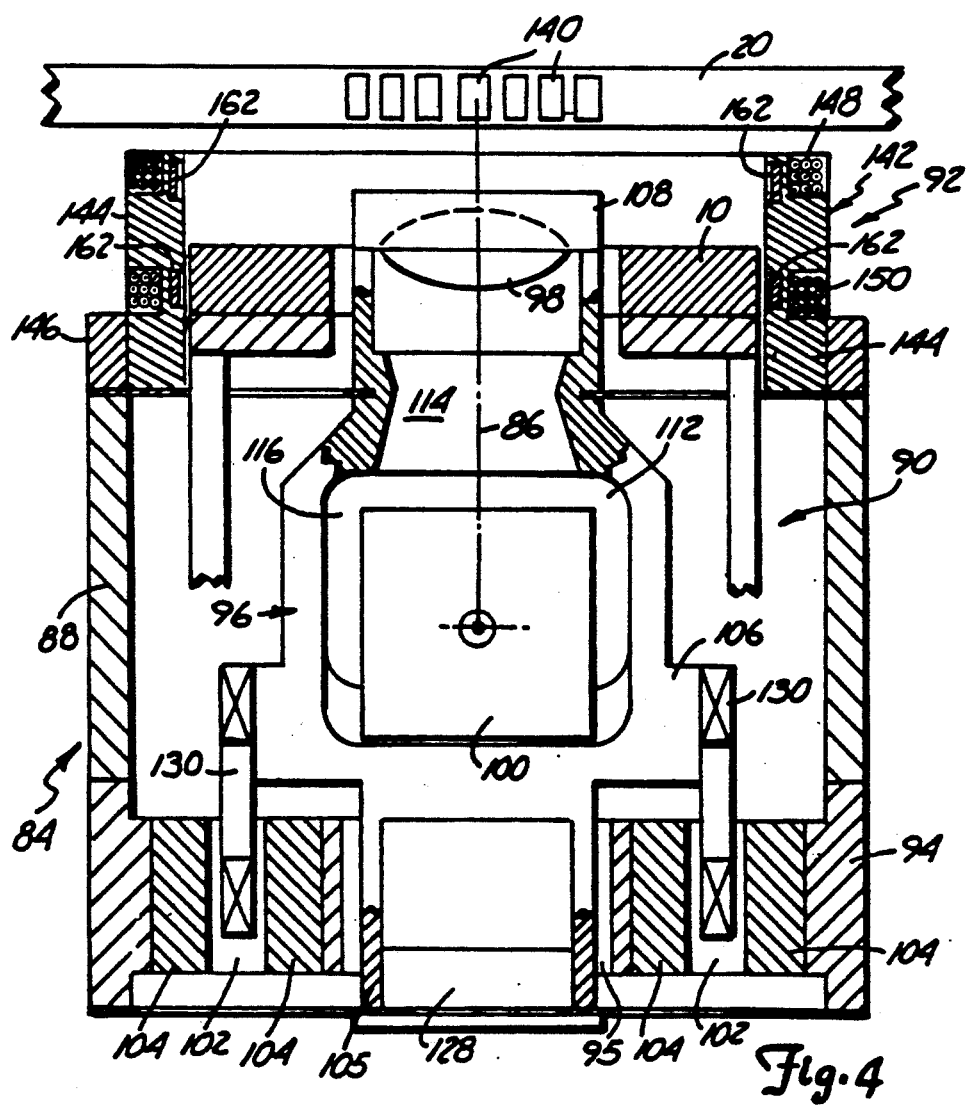
FIG. 4 is a detailed cross-sectional representation of a focus/bias field switching assembly shown in FIG. 3.
Figure 5:
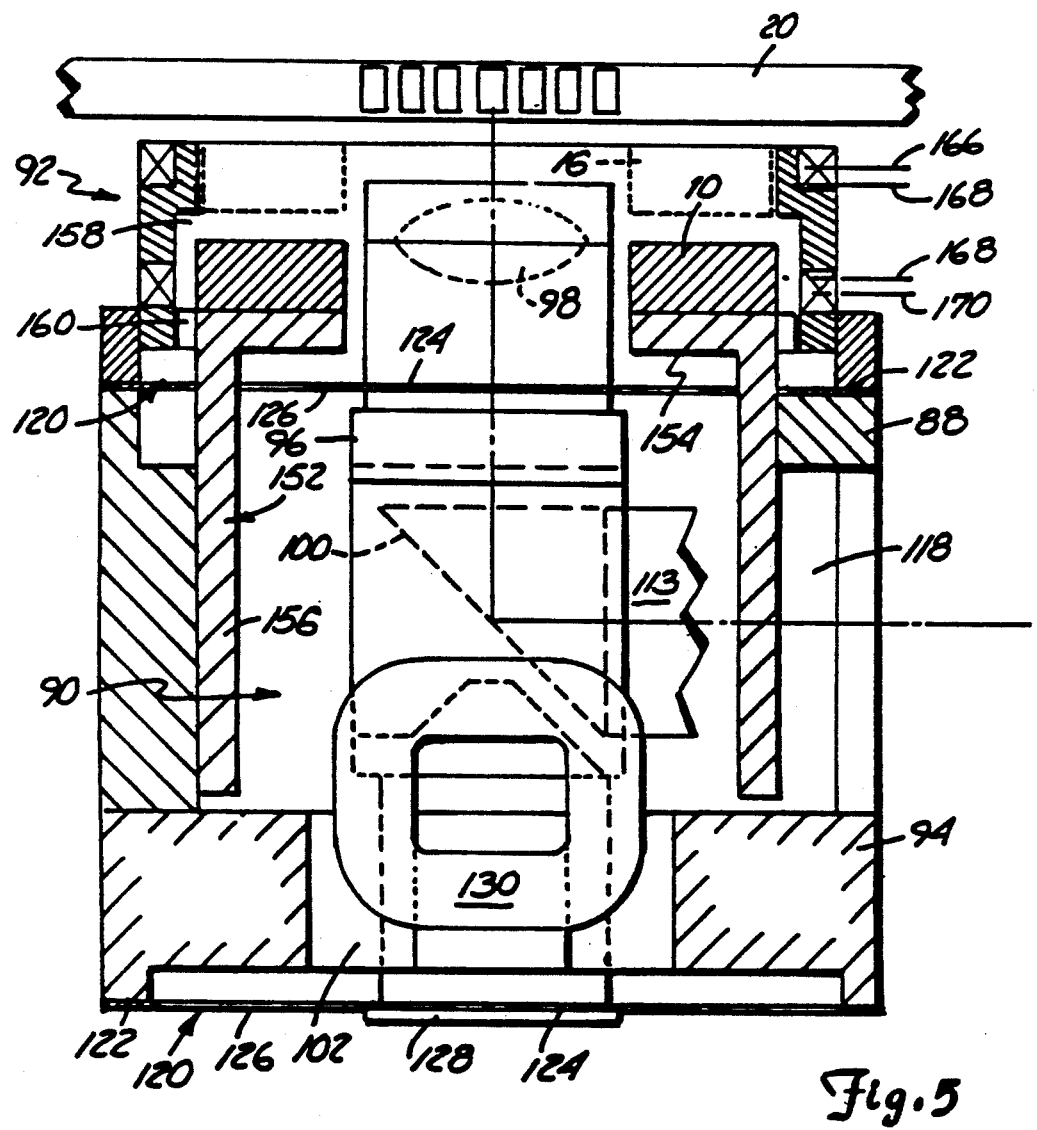
FIG. 5 is a detailed cross-sectional diagram of the focus/bias field switching assembly shown in FIG. 3 and taken from a side displaced from the side shown in FIG. 4 by ninety degrees.

Lens support 96 is preferably a one-piece plastic member which includes a lower mounting section 105, middle prism cage section 106 and upper lens mount section 108. As shown in FIGS. 4 and 5, sections 105, 106 and 108 of lens support 96 are vertically spaced about the path of beam 86. One side of prism cage section 106 has a beam opening 116 which extends into prism cavity 112. An elongated opening 114 extends through lens support 96 between lens mount section 108 and prism cavity 112, forming a path for beam 86. Objective lens 98 is mounted within lens mount section 108 of lens support 96. Prism 100 is positioned within cavity 112 and is fixedly mounted to housing 88 by means of supports such as 113 (FIG. 5). Beam opening 116 which extends into prism cage section 106 of lens support 96 is aligned with an opening 118 which extends through housing 88. Incident portions of beam 86 directed to focus/bias field switching assembly 84 pass through openings 118 and 116 before being reflected by prism 100, directed through lens 98, and impinged upon disk 20. Portions of beam 86 reflected from disk 20 traverse an identical path before they are directed back to turn-around prism 74.

A pair of leaf-type springs 120 movably support lens support 96 within housing 88, with its lower mounting section 105 extending through aperture 95 of pole piece 94. Each spring 120 has a circular outer rim 122, a circular inner rim 124, and a leaf member 126 extending between the inner and outer rims. Outer rim 122 of one of springs 120 is bonded to a lower edge of pole piece 94, while its inner rim 124 is secured to mounting section 105 of lens support 96 by fastening plug 128. The other spring 120 has its outer rim 122 bonded to an upper edge of housing 88 and its inner rim 124 secured to lens mount section 108 of lens support 96.

A pair of wire coils 130 are secured to opposite sides of lens support 96. As shown in FIGS. 4 and 5, coils 130 extend into elongated apertures 102 between magnets 104. Focus drive signals produced by a focus servo system (not shown) are applied to coils 130. Magnetic fields generated by coils 130 interact with the magnetic fields between magnets 104. Lens support 96 is then driven against a bias force of springs 120 along a focus axis generally perpendicular to disk 20. Incident portions of radiation beam 86 are thereby focused onto individual bit positions 140 by objective lens 98.

Bias field assembly 92 includes an annular permanent magnet 10 such as that described above, and an actuator mechanism 142 for driving the magnet between its write and erase positions with respect to disk 20. Actuator 142 includes a ring-shaped plastic coil form and magnet housing 144 which is mounted to an upper edge of arm housing 88 by means of mounting ring 146. Housing 144 includes two sets of coils 148 and 150 wound about recesses in its exterior surface.

Actuator assembly 142 also includes magnet sliding guide 152 which has a ring-shaped magnet receiving face 154 and a plurality of legs 156 which extend downward into housing 88 from magnet housing 144. As shown, ring magnet 10 is mounted to face 154 of guide 152. Magnet 10 and face 154 of guide 152 are concentrically positioned around lens mount section 108 of lens support 96. Magnet 10 and guide 152 are movable within magnet housing 144 between a write position illustrated in solid lines in FIG. 5, and an erase position illustrated in broken lines. When in its write position, magnet 10 will be positioned at a distance such as y2 from disk 20, and impinge a magnetic B field having a value less than or equal to the write threshold upon bit positions 140 on which objective lens 98 is focusing beam 86. When moved to its erase position, magnet 10 will be at a distance such as y1 from disk 20. A magnetic B field having a value greater than or equal to the erase threshold is then impinged upon bit positions 140, permitting data to be erased from these bit positions.

Guide 152 prevents magnet 10 from becoming cocked and wedged within magnet housing 144 while it is being driven between its write and erase positions. As shown in FIG. 5, portions of legs 156 ride along an interior surface of housing 88 while guide 152 and magnet 10 are moved together. Magnet housing 144 also includes several grooves 158 on its interior surface. Guide lugs 160 which extend radially outward from the edges of guide face 154 ride within grooves 158. Lugs 160 engage mounting ring 146 when magnet 10 is in its write position, and prevent further movement of the magnet and guide 152 from disk 20. The movement of magnet 10 in a direction toward disk 20 is limited to the erase position when lugs 160 engage the upper ends of grooves 158. Magnet 10 is held in both the write and erase positions by its magnetic attraction to ferro-magnetic members 162. Members 162 are mounted within recesses in the interior surface of magnet housing 144 adjacent magnet 10 in both its write and erase positions. The size of members 162 and the distance between them and edges 18 of magnet 10 can be adjusted to control the retaining force tending to hold magnet 10 in its write or erase positions.

As shown in FIG. 5, coils 148 and 150 are located in planes parallel to pole surfaces S and N of magnet 10. Coils 148 are positioned on magnet housing 144 in such a manner that the center 166 of the plane in which they located is positioned closer to the top edge of the magnet housing than the center 168 of width dimension D3 of magnet 10 when the magnet is in its erase position. Coils 15 are positioned on magnet housing 144 at such a location that the center 170 of the plane in which they are located is closer to the lower edge of the magnet housing than center 168 of magnet 10 when the magnet is in its write position.

Coils 148 and 150 are connected in series with one another and function in a solenoid-like manner. As indicated by the dot and arrow current flow convention used in FIG. 4, coils 148 are wound in a direction opposite that of coils 150. In response to a bias field select pulse of a first or positive polarity applied to coils 148 and 150, the magnetic fields generated by the coils will interact with the magnetic fields of magnet 10 and force the magnet to its write position. Magnet 10 will be held in the write position by the force of attraction with ferro-magnetic members 162 adjacent coils 150. When a bias field select pulse of a second or negative polarity is applied to coils 148 and 150, the magnetic fields generated by these coils will interact with the field of magnet 10 and force the magnet to its erase position. Magnet 10 will be held in its erase position by the attractive force with ferro-magnetic members 162 adjacent coils 148. The polarity of the bias field select pulse applied to coils 148 and 150 therefore determines whether magnet 10 is located in its write or erase positions.

Bias field subassembly 92 has considerable advantages over prior art systems used to generate write and erase bias fields. The subassembly includes only a few parts, none of which need to be manufactured to high tolerances. The subassembly is therefore relatively inexpensive. It is also compact and low mass, enabling the subassembly to be carried by the rotary arm. The bias field state is easily controlled and quickly switched by a select pulse. Continuous current flow need not be applied to produce either the write or erase fields. Heat dissipation can therefore be reduced. All of these features facilitate the use of the subassembly in a half-height drive.

Although the present invention has been described with reference to preferred embodiments, workers skilled in the art will recognize that changes may be made in form and detail without departing from the spirit and scope of the invention.

What is claimed is:

1. A disk drive apparatus comprising:
   disk means for storing data thereon comprising a first side and an opposite second side;
   permanent magnet means having a first side located adjacent said first side of said disk means and linearly displaceably relative thereto for selectively impinging opposite polarity portions of a magnetic field on said disk means for writing and erasing data, said permanent magnet means having a magnetic field positioned about a magnet axis extending outwardly from said first side of said magnet means toward said disk means, said magnetic field having a first polarity portion at a first distance from said permanent magnet means along said magnet axis and a second opposite polarity portion at a second distance from said permanent magnet means along said magnet axis;
   displacement means for linearly displacing said permanent magnet means relative said first side of said disk means, between a writing position at which said disk means intersects said magnet axis at said first distance from said permanent magnet means and an erasing position at which said disk means intersects said magnet axis at said second distance from said permanent magnet means.

2. The invention of claim 1 wherein said permanent magnet means comprises a ring magnet having a first annular, generally axially extending surface portion defining a central aperture of said ring magnet; a second annular, generally axially extending surface; a first generally radially extending surface extending between said first and second annular surfaces and defining said first side of said magnet means; and a second generally radially extending surface extending between said first and second annular surfaces positioned opposite said first generally radially extending surface.

3. The invention of claim 2 said ring magnet having a first pole located at said first generally radially extending surface and having a second pole located at said second generally radially extending surface.

4. The invention of claim 3 wherein said displacement means comprises peripheral coil means positioned about the periphery of said ring magnet in relatively axially displaceable relationship therewith for generating a magnetic field which coacts with said magnetic field of said ring magnet.

5. The invention of claim 2 further comprising laser means for directing a laser beam through said aperture of said ring magnet onto said disk means.

6. The invention of claim 5 further comprising objective lens means for focusing said laser beam and having an optical axis extending through said aperture of said ring magnet.

7. A method for generating write and erase bias fields for use in conjunction with a magneto-optic recording medium on which data can be written and erased, including:
   providing a magnet with a side surface and producing a magnetic field which changes in polarity with increasing distance from the side surface, the magnetic field having a first polarity at a first distance from the side surface and a second opposite polarity at a second greater distance from the side surface;
   positioning the magnet with the side surface at one of said first distance and said second distance from the magneto-optic recording medium and facing the recording medium, when erasing data; and
   positioning the magnet with the side surface at the other of said first distance and said second distance from the magneto-optic recording medium and facing the recording medium, when writing data.

8. The method of claim 7 wherein providing a magnet includes providing a permanent magnet having an aperture extending through the magnet.

9. The method of claim 8 wherein the steps of positioning the magnet comprise the step of generating a magnetic field with an electrical coil positioned coaxially with the permanent magnet.

10. The method of claim 8 and further including heating the recording medium when writing or erasing data with a laser beam extending through the aperture of the magnet.

* * * * *